3,682,650
PROCESS FOR PREPARING FROZEN COFFEE
AND PRODUCT PRODUCED THEREFROM
Harry T. Easton, Greenwich, Conn., and Daniel E.
Dwyer, Westbury, N.Y., assignors to General Food
Corporation, White Plains, N.Y.
No Drawing. Filed May 22, 1970, Ser. No. 40,476
Int. Cl. A23f 1/08
U.S. Cl. 99—71                8 Claims

ABSTRACT OF THE DISCLOSURE

Freeze-dried coffee having a control density and a dark color simulating roasted and ground coffee is produced by forming a slurry of ice crystals of controlled size and a mother liquor contacting these crystals having a concentration of about 40% to 50% soluble solids prior to freezing and freeze drying.

BACKGROUND OF THE INVENTION

Field of the invention

The present invention relates to improving the color and density of freeze-dried coffee. More particularly, this invention concerns forming a slurry of coffee extract containing ice of controlled crystal size, and mother liquor of controlled solids concentration prior to conventional freezing and freeze drying of the extract.

Description of the prior art

Generally, it is recognized that rapid freezing of coffee extract will promote the distribution of small sized ice crystals and that slow freezing will produce ice crystals of large size. The injection of gas to foam extract is also known (Belgian Pat. No. 678,350, and U.S. Pat. No. 3,309,779).

It is further known that freezing influences final freeze-dried color. Various attempts have been made to produce dark freeze-dried coffee. Simon et al., U.S. Pat. No. 3,443,963, employ a process wherein coffee extract is cooled to a temperature of 25 to 20° F. and held for a period of 10 to 20 minutes prior to quick freezing of the mass of ice and extract mother liquor at a rapid rate to below its eutectic point and freeze drying the froezn extract. Elerath et al., U.S. Pat. No. 3,373,042, teach that coffee extract should be treated in a first cooling zone to develop large ice crystal growth, say over a period of 15 to 20 minutes, followed by quick freezing and subsequent freeze drying. Lutz, U.S. Pat. No. 3,399,061, teaches darker colors are obtained by slowly cooling, preferably uniformly, coffee extract from its ice point to below its eutectic point over a period of at least 15 minutes. Clinton et al., U.S. Pat. No. 3,438,784, teach that for coffee extract solids contents between 30% to 50% it is essential that the extract be frozen at a sufficiently slow rate, preferably 30 minutes, to form a haphazard or non-ordered distribution of ice crystals. In Lutz and Clinton et al., agitation is not employed once the ice point has been reached and crystal development is initiated.

The aforementioned color darkening patents basically deal with controlled freezing of extract employing static systems, such as trays or belts to obtain the final frozen product for freeze drying. The use of static freezing equipment is expensive, and it has long been a concern of those working in the extract freezing field to employ a simplified freezing system which will give equal or better dark color in the final freeze-dried product. A further problem is that the prior art systems do not provide for adjusting the density (which is generally much greater than spray-dried soluble coffee, particularly where high solids extracts are processed) as well as ice crystal size and mother liquor solids concentrate of the frozen extract, and therefore do not offer means of controlling the final freeze-dried product density and color.

SUMMARY OF THE INVENTION

The general purpose of this invention is to provide a process for controlling, during the freezing of coffee extract, the ice crystal size, mother liquor solids concentration and the density of an extract slush which is subsequently frozen and freeze dried. The chief purpose of this invention is to produce a final freeze-dried, soluble coffee product of dark and controllable color simulating that of roasted and ground coffee, and of controllable density approaching that of conventional spray-dried soluble coffees. A further purpose is to provide coffee extract slurry prepared employing an agitated crystallization process which can be finally frozen by any inexpensive conventional technique, and which will produce a final frozen product which may be freeze dried at a rapid rate.

The process of this invention employs simplified equipment and it does away with the necessity of static freezing on belts or in trays. The process of this invention further provides means for simultaneously controlling both the density and color of the final freeze-dried product.

The advantages of this process are obtained by rapidly cooling coffee extract to below its ice point to form a slurry of coffee ice particles and mother liquor at a temperature below the freezing point of the extract, maintaining the slurry at 14 to 20° F., for a period of time sufficient to form ice particles having an average diameter of at least 0.5 mm., and a mother liquor having a soluble solids content of 40% to 50% in contact with the ice crystals. Control of density is achieved by control of the ice crystal size and, where necessary, by the addition to the slurry of gas, particularly where high concentration extracts are being frozen. The mixture of ice and mother liquor is then frozen by conventional means to produce a frozen extract suitable for rapid freeze drying.

The process of this invention not only produces the desired ice crystal diameter and mother liquor concentration, but coalesces the gas where employed for foaming, to develop larger gas bubbles, thus achieving lighter density in final freeze-dried dark product.

An object of the present invention is the provision of a process for producing a dark freeze-dried coffee of controlled density.

Another object is to provide a means for obtaining a frozen extract of controlled density, ice crystal size and mother liquor concentration.

A further object is to simplify the processing equipment and procedures necessary for producing commercial freeze-dried coffee.

DESCRIPTION OF THE INVENTION

This invention is founded on the discovery that a dark colored freeze-dried coffee of controllable density can be produced by a process which comprises preparing a coffee extract slurry of small sized ice crystals and mother liquor, maintaining the slurry under gentle agitation at a temperature between 14 to 24° F. for a period of time sufficient to produce a slurry of extract containing water particles having an average diameter of at least 0.5 mm., a mother liquor concentration of 40% to 50% soluble solids, and subsequently freezing this mixture by conventional techniques to produce a frozen coffee extract suitable for rapid conventional freeze drying.

Where high extract concentrations are processed and gas is added to the slurry, the density of the slurry should be 0.6 to 0.85 g./cc. The exact extract slush density required for a given extract concentration is easily determined by adding sufficient gas in stages to produce a final freeze-dried product of 0.18 to 0.22 g./cc. bulk density, said product having 90% of its particles between 400 to 4000 microns. Thus, a most preferred technique for practicing the process of this invention is to cool extract rapidly, say less than 15 minutes, to a temperature below the ice point to produce an extract slurry having fine ice crystals dispersed therein. This may be accomplished by using a scraped film heat exchanger such as a "Votator," by cooling the extract and seeding with frozen coffee extract or ice, or any other art recognized techniques and combinations of techniques to produce an extract slurry of fine frozen particles dispersed in an aqueous mother liquor of coffee solids having a concentration of less than 40%. For concentrated extracts having solids contents in excess of about 30%, it is preferable to introduce into the slurry gas, preferably non-oxidizing and inert, to control the density of the slurry and final product.

The extract slurry containing fine particles, and optionally inert gas, is next maintained at a temperature from 14 to 24° F. under conditions of gentle agitation for a time sufficient to produce ice crystals wherein 50% of the ice particles present have a diameter of at least 0.5 mm. and a mother liquor containing the 0.5 mm. ice crystals having a solids concentration from 40% to 50% coffee solids.

In general, at least about 2 hours of controlled crystallization at 14 to 24° F. are required to develop the proper ice crystal size and mother liquor concentration. Of course, the crystallization time required will depend upon the initial extract concentration, the particular average ice crystal size and mother liquor concentration desired, and times less than 2 hours may be sufficient. The maximum time of controlled crystallization can be far in excess of 2 hours, but is limited by a maximum development in ice crystal particle size due to attrition of the growing ice particles by the agitation maintained throughout the controlled 14 to 24° F. crystallization. Periods of 2 hours or more have been found ideal for developing both the ice crystal size and for allowing the gas employed in modifying density to coalesce and form desirably larger gas particles.

The inert gas employed for density control can be introduced into the slurry by conventional techniques, for example, directly into the crystallizer, but preferably by injection into a scraped film heat exchanger which is used to cool the extract prior to the 14 to 24° F. crystallization. Nitrogen is preferred for density control being inert and non-oxidizing. It is preferred to employ inert gas in addition to ice crystal size to control the slurry density and final dry product density when processing coffee extracts having 30% to 40%, particularly 35% to 40%, coffee solids.

The process of this invention may treat either conventional extract or extracts to which have been added flavor and aroma components such as steam volatile aromas, coffee oil, and/or natural and synthetic compounds known to produce desirable coffee flavors.

EXAMPLE I

Coffee extract (2000 gms.) having a soluble solids content of 27% is rapidly cooled to a temperature of about 27° F. to form a slurry of fine ice crystals.

The slurry is transferred to a precooled Hobart ice cream machine maintained at about 21° F. using a brine bath. The slurry is maintained under gentle agitation by manually turning the agitator while visually observing the ice crystal formation. Agitation is adjusted to maintain a relatively uniform slurry without retarding the development of large ice crystals. After 3½ hours of crystallization in the ice cream machine, the slurry is removed and transferred to a tray chilled to about 20° F. The slurry removed has a mother liquor concentration of about 42% solids and contains a majority of ice crystals having a diameter of greater than 0.5 mm. A layer of slurry about ½ inch thick is formed in the tray which is then immersed in a −35° F. brine bath. The slurry is frozen solid to below −20° F., the slab is removed and is freeze dried as a single slab using conventional vacuum freeze drying techniques. After drying and grinding, the product has the appearance of roasted and ground coffee exhibiting a pleasing dark color and density approaching that of conventional soluble coffee.

EXAMPLE II

Coffee extract from a conventional ice crystal concentration of coffee percolate and containing 39% soluble solids is rapidly cooled in a Hoyer scraped film heat exchanger. Nitrogen gas is introduced into the Hoyer and contacted with the extract to form a foamed extract which is discharged continuously into an agitated insulated crystallization tank. Fine particles of frozen extract are incorporated with the foamed extract to maintain a foamed slurry of frozen extract particles in mother liquor at a slurry temperature of about 19° F. The slurry is maintained at constant temperature by adjusting the quantity of frozen particles added to the tank, and the foamed extract temperature. The slurry is maintained in the tank and contains about 22% of the available water in the form of ice crystals having an average diameter of at least 0.5 mm. and a mother liquor concentration of about 45% solids. The gas introduced with the foamed extract is coalesced in the slush to develop a smaller number of larger gas bubbles contained within the slurry. The small ice particles added continuously to the tank are melted by the gentle agitation. The extract slurry density is about 0.72 g./cc. Slurry is continuously pumped from the tank to a Sandvick freezing belt while maintaining a constant extract slurry level in the crystallization tank. The slurry is rapidly frozen into slabs. The slabs are ground and screened. Fine frozen extract from the screening is returned to the crystallizer tank while large particles are reground. The desired particle size, simulating roasted and ground coffee (90% have a particle size from 400 to 4000 microns) are freeze dried in trays using conventional techniques. The final freeze-dried product is dark in color and has a bulk density of about 0.19 to 0.21 g./cc.

The small ice crystals in the initial slush can be formed by adding fines alone as in the previous example or by using the Hoyer heat exchanger to form an extract slurry of fine ice crystals, or by any combination of art recognized methods.

The foregoing examples were for illustrative purposes only, and the invention is intended to be limited only by the appended claims.

What is claimed is:

1. A process for preparing a coffee extract suitable for rapid freezing and freeze drying, and which produces a dark color and controlled density in a final dry coffee comprising:

cooling coffee extract containing 24% to 40% solids to form a slurry of fine frozen crystals and mother liquor;

maintaining the extract slurry at a temperature between 14 to 24° F. and under gentle agitation throughout a period of time of at least 2 hours to restructure the crystals and to produce in the slurry;

frozen crystals, at least 50% of said crystals having a particle diameter of at least 0.5 mm.; and a mother liquor of 40% to 50% solids.

2. The process of claim 1 wherein the coffee extract is maintained at about 19° F.

3. The process of claim 1 wherein the coffee extract contains 30% to 40% solids and which further includes incorporating in said extract an inert, non-oxidizing gas and maintaining in said extract slurry a density of 0.6 to 0.85 g./cc., said 2 hours of gentle agitation being sufficient to coalesce the inert gas.

4. The process of claim 2 in which the extract slurry density is 0.72±0.02 g./cc.

5. A coffee extract slurry suitable for rapid freezing and freeze drying produced by the process of claim 1.

6. A process for preparing a freeze-dried coffee of dark color and controlled density comprising:

cooling coffee extract containing 24% to 40% solids to form a slurry of fine frozen crystals and mother liquor;

maintaining the extract slurry at a temperature between 14 to 24° F. and under gentle agitation throughout a period of time of at least 2 hours to restructure the crystals and to produce in the slurry; frozen crystals, at least 50% of said crystals having a particle diameter of at least 0.5 mm.;

a mother liquor of 40% to 50% solids; and freezing the restructured extract slurry and vacuum freeze drying the frozen extract.

7. The process of claim 6 wherein the coffee extract contains 30% to 40% solids and which further includes incorporating in said extract an inert, non-oxidizing gas and maintaining in said extract slurry a density of 0.6 to 0.85 g./cc., said 2 hours of gentle agitation being sufficient to coalesce the inert gas.

8. A freeze-dried soluble coffee of dark color and controlled density produced by the process of claim 7.

References Cited

UNITED STATES PATENTS

| 3,443,963 | 5/1969 | Simon et al. | 99—71 |
| 3,309,779 | 3/1967 | Ginnette et al. | 99—71 UX |
| 3,373,042 | 3/1968 | Elerath et al. | 99—71 |
| 3,399,061 | 8/1968 | Lutz | 99—71 |
| 3,443,962 | 5/1969 | Elerath | 99—71 |
| 3,482,990 | 12/1969 | Pfluger et al. | 99—71 |

FRANK W. LUTTER, Primary Examiner

W. L. MENTLIK, Assistant Examiner

U.S. Cl. X.R.

99—199